United States Patent Office.

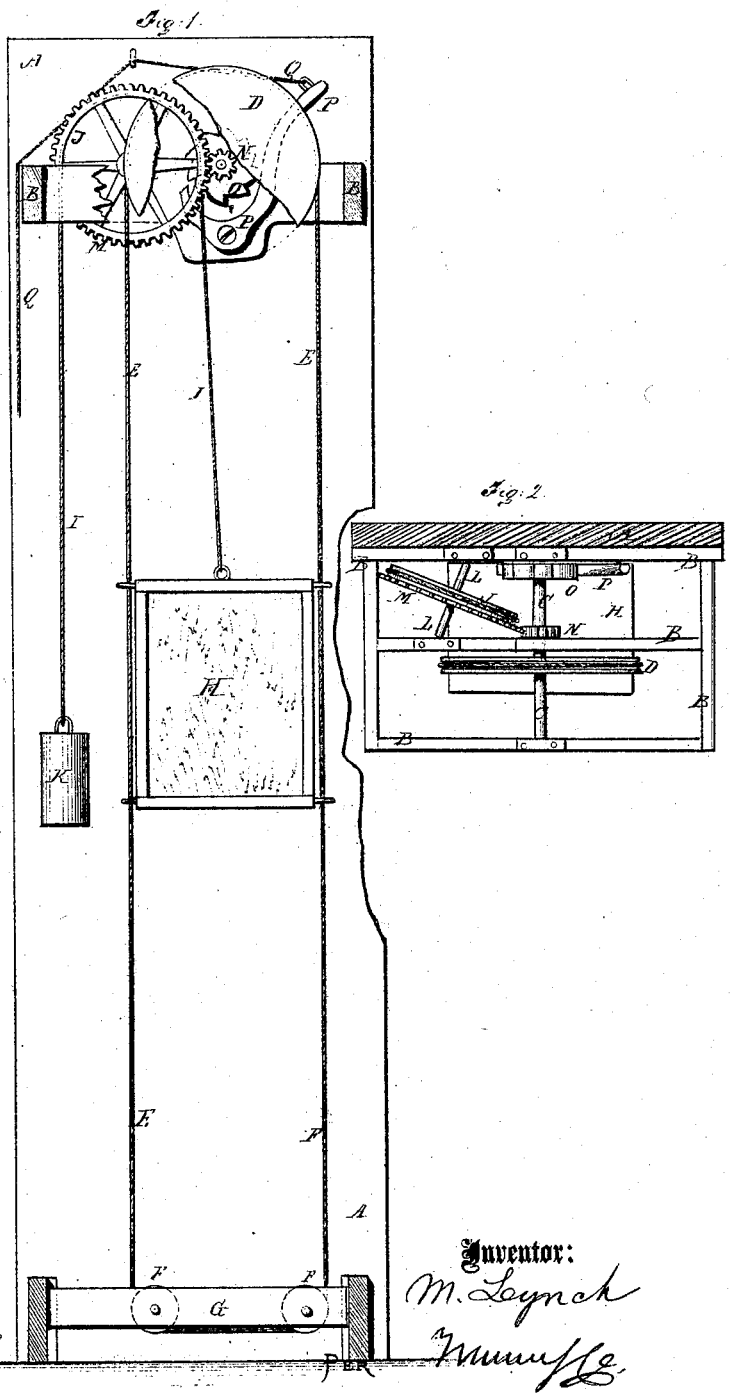

MATTHEW LYNCH, OF NEW YORK, N. Y.

Letters Patent No. 99,578, dated February 8, 1870.

---

IMPROVEMENT IN HOISTING-MACHINES.

---

The Schedule referred to in these Letters Patent and making part of the same.

---

*To all whom it may concern:*

Be it known that I, MATTHEW LYNCH, of the city, county, and State of New York, have invented a new and useful Improvement in Hoisting-Apparatus; and I do hereby declare that the following is a full, clear, and exact description thereof, which will enable others skilled in the art to make and use the same, reference being had to the accompanying drawings, forming part of this specification, in which—

Figure 1 is a front view of my improved hoisting-apparatus.

Figure 2 is a top view of the same.

Similar letters of reference indicate corresponding parts.

My invention has for its object to furnish a simple, convenient, reliable, and safe hoisting-apparatus, designed more particularly for use upon the outside of school and other buildings, but also applicable for use in other situations, and which shall be so constructed that it may be stopped, and will remain stationary at any desired elevation; and It consists in the construction and combination of various parts of the apparatus, as hereinafter more fully described.

A represents the side of a building, to the upper part of which is securely attached a horizontal frame, B.

C is a shaft, revolving in bearings attached to the middle part of the frame B.

To the shaft C is attached a large grooved wheel, D, the size of which depends upon the weights to be raised at a time.

E is an endless rope, which passes over the grooved wheel D, and which is kept vertical and at the same time taut, by passing around two guide-pulleys, F, pivoted to a heavy beam, G, the ends of which are placed in vertical slots or guides, as shown in fig. 1, so that its weight may be supported by the rope E.

H represents the box, platform, dumb-waiter, or other device in or upon which the articles to be raised are placed.

The rope E passes through keepers or guide-eyes attached to the sides of the box H, or through holes formed in the said box or platform, according to its construction, to keep the said box or platform in proper position while being raised and lowered, so that no guides or ways will be required to keep the said box or platform in proper position.

To the upper part of the box or platform H, or to supports attached to said platform or box, is attached the end of the rope I, in such a position as to be directly over the centre of gravity of said box or platform H.

The rope I passes over the wheel J, and to its other end is attached a balancing-weight, K, as shown in fig. 1.

The wheel J is attached to a shaft, L, the journals of which revolve in bearings attached to the frame B, and which is placed in an inclined position, so that one side of said wheel J may be directly over the middle part of the box or platform H, to support the said box or platform H, and raise and lower it vertically.

This position of the wheel J also brings the weight K into such a position that it may move up and down close along the side A of the building.

To the side of the wheel J is attached, or upon it is formed a gear-wheel, M, the teeth of which mesh into the teeth of a small gear-wheel, N, attached to the shaft C.

To the shaft C is also attached a ratchet-wheel, O, with the teeth of which the pawl P engages, to hold the apparatus in any position in which it may be stopped.

The pawl P is pivoted to a support attached to the frame B, and is so formed that its own weight may hold its engaging end forward against the teeth of the ratchet-wheel O.

The teeth of the ratchet-wheel O, and the body or lever of the pawl P, are so formed, that when the engaging end of the said pawl is withdrawn from the teeth of the ratchet-wheel O, the body of the pawl may be pressed against the said ratchet-wheel to serve as a brake in lowering the apparatus.

To the free end or lever of the pawl P is attached the end of the rope or cord Q, which passes through guide-eyes or around guide-pulleys, and is brought into such a position that it may be reached and operated by the attendant, to detach the pawl and lower the apparatus from the base of the apparatus or from the box or platform H, as may be desired or convenient.

The apparatus is raised by pulling down upon the endless rope E, and it is lowered by means of the combined pawl and brake P, as hereinbefore described.

The apparatus may be placed upon the outside of a building, or it may be placed in a hoistway or well, as may be desired or convenient.

Having thus described my invention,

I claim as new, and desire to secure by Letters Patent—

1. The combination of the beam G, guide-pulleys F, and box or platform H, with the endless rope E, to adapt said rope to serve both as a hoisting-rope and as a guide or way to the said box or platform, substantially as herein shown and described.

2. The combination and arrangement of the wheel J and gear-wheel M with the weighted rope I K, box or platform H, small gear-wheel N, shaft C, and wheel D, around which the endless rope E passes, substantially as herein shown and described, and for the purpose set forth.

3. The combined brake and pawl and ratchet-wheel P O, in combination with the operating-rope Q, shaft C, gear-wheels N and M, wheel J, weighted rope I K, and box or platform H, substantially as herein shown and described, and for the purpose set forth.

The above specification of my invention signed by me, this 21st day of December, 1869.

MATTHEW LYNCH.

Witnesses:
GEO. W. MABEE,
JAMES T. GRAHAM.